Oct. 2, 1923.
H. W. PLEISTER
BOLT ANCHOR
Filed Jan. 4, 1922
2 Sheets-Sheet 1
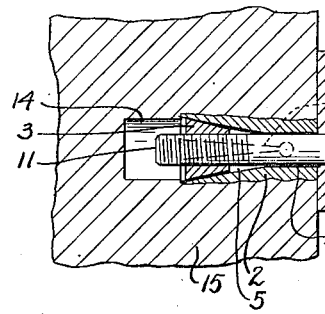
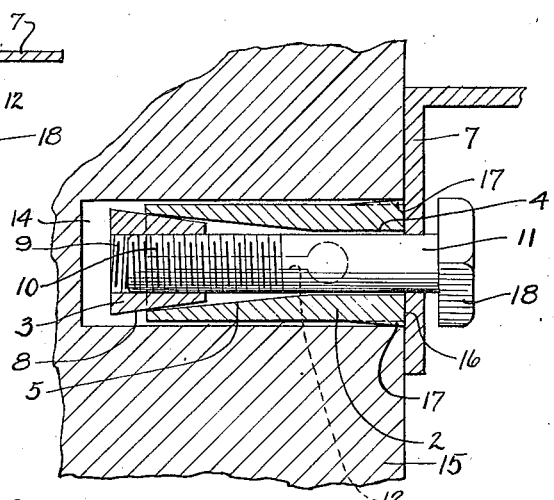
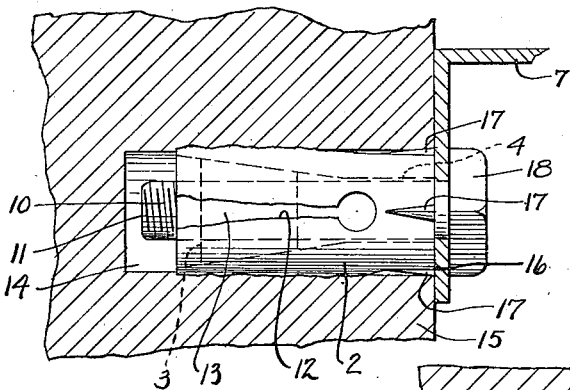
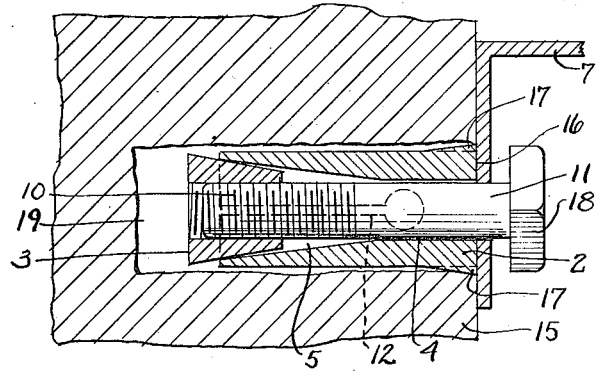
Henry W. Pleister INVENTOR
BY Alan M Johnson ATTORNEY Oct. 2, 1923.

H. W. PLEISTER

BOLT ANCHOR

Filed Jan. 4, 1922

Henry W. Pleister INVENTOR
BY Alan M. Johnson ATTORNEY

Patented Oct. 2, 1923.

1,469,667

UNITED STATES PATENT OFFICE.

HENRY W. PLEISTER, OF WESTFIELD, NEW JERSEY, ASSIGNOR TO HENRY B. NEWHALL.

BOLT ANCHOR.

Application filed January 4, 1922. Serial No. 526,921.

*To all whom it may concern:*

Be it known that I, HENRY W. PLEISTER, a citizen of the United States, residing at Westfield, in the county of Union and State of New Jersey, have made certain new and useful Improvements in Bolt Anchors, of which the following is a specification taken in connection with the accompanying drawings.

My invention relates to a bolt anchor in which the expansible shield is provided with a conical bore, and a conical nut, free from lugs or projections, adapted to be held within the conical bore of the shield by friction or by any suitable binder, as for example, cementitious material, or any other suitable material, thereby obviating the necessity of employing additional members to hold the parts together during packing, handling and transportation.

My invention further relates to such a bolt anchor, in which the shield is provided with one or more grooves, extending towards, but not reaching, the axial bore, leaving webs, which are adapted to resist the expanding action of the cone nut upon the tapered inner walls of the bore of the shield when it is placed within the shield with sufficient friction to hold the nut in place in transit and handling and until it is placed in operative position in the wall.

My invention further relates to such a bolt anchor in which the shield and cone, or expanding member, are formed of materials of different strength, the expanding cone being of greater hardness and less ductility than the shield.

My invention further relates to forming the shield of some ductile material, as lead or an alloy, so that when it is expanded the metal will flow, more or less, into the irregularities and voids of the wall of the hole. The expanding cone is formed of some harder material, as for example, iron, which may or may not be galvanized.

My invention further relates to certain combinations, details of constructions, and articles of manufacture, which will be more fully hereinafter described and pointed out in the claims.

In the accompanying drawings, the same reference numerals refer to similar parts in the several figures.

Fig. 1 is a vertical section, showing my bolt anchor expanded;

Fig. 2 is a vertical section, similar to Fig. 1, but on an enlarged scale, showing the position of the parts before operating the expanding cone;

Fig. 3 is a vertical section through the wall or other suitable support and the work, the bolt anchor being shown in side elevation;

Fig. 4 is a vertical section, similar to Fig. 2, but showing the bolt anchor in a poorly drilled and enlarged hole;

Prior to my invention, it has been old to use an expansion shield formed of a plurality of parts and conical nuts, provided with lugs or projections to cooperate with special engaging surfaces on the shield. To assemble these parts for shipping, it is necessary to bring the lugs or projections upon the cone member into cooperating position with the special engaging surfaces on the shield, and then secure the parts together by some binding member, as for example, wire wrapped on the exterior of the shield, or spring rings. This method is very expensive and unsatisfactory, for considerable time is taken in assembling each of the bolt anchors.

It is found in practice that the vibration, jostling in transportation, and handling will cause many of the constituent parts of the bolt anchors to become separated, so that the dealer, before putting them upon his shelves, has to go over the shipment to see whether or not all the bolt anchors are properly assembled and held together, and to reassemble such as have become separated during transit. This takes additional time, adds to the expense and is a considerable annoyance to the dealer.

Prior to my invention it was also old to use cone nuts with tubular ductile lead sleeves having a tapered interior bore and walls of uniform circumferential thickness, without grooves or slots to facilitate or even to permit expansion by means of a bolt and wrench.

Such expansions as I have just described required the use of special tools to drive the lead shield down over the cone nut. They required the heavy blows of a hammer to caulk them down over the cone nuts to drift them out or expand them.

By means of grooves and webs provided in my shield, as hereinafter described, I overcome the disadvantages of the shield made of a plurality of parts provided with lugs, springs, etc., and also overcome the objectionable features of the lead sleeves which required caulking tools and the laborious work of caulking them in the wall with a hammer.

By my invention I obtain a bolt anchor, which can be manufactured at minimum expense; requires no additional member to secure the parts together; can be assembled with great speed and accuracy, and after being once assembled, the parts stay assembled and will not become disconnected during transportation or handling, so that all the annoyances and expense incident to the manufacture and sale of the present bolt anchors are avoided.

Figure 7:
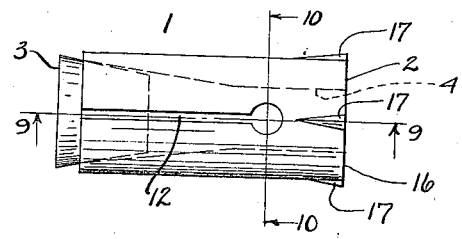
Fig. 7 is a plan view of the complete bolt anchor, comprising the expansible shield and the cone nut secured to it by friction.
Figure 8:
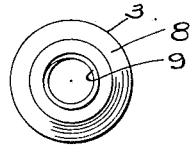
Fig. 8 is a rear end elevation of the parts shown in Fig. 7.
Figure 9:
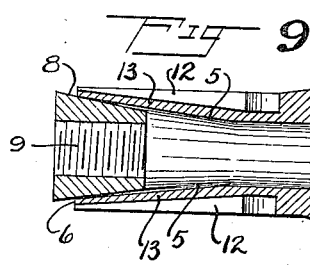
Fig. 9 is a vertical section on line 9—9 of Fig. 7, looking in the direction of the arrows.
Figure 10:
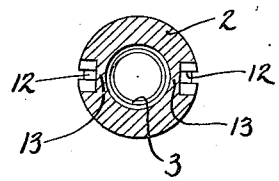
Fig. 10 is a vertical section on the line 10—10 of Fig. 7.
Figure 11:
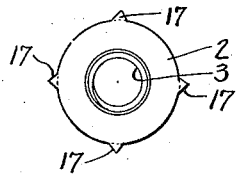
Fig. 11 is a front elevation of the shield.

My bolt anchor 1 consists essentially of two members, the shield 2 and the conical nut 3, see Figs. 7 and 9. The shield 2 is provided with an axial bore 4, which is cylindrical for part of its length and then is formed flaring or conical at point 5 to the end 6 of the shield. Within this conical or flaring portion of the axial bore, the conical nut 3 is seated and held by friction.

Unlike the conical expanding nuts, which are now employed in the art, which have lugs or projections of various forms and contours upon them, my conical nut 3 is provided with a smooth exterior conical surface 8, so that it can be made very cheaply and with great speed in automatic screw machines. In bolt anchors in which the exterior surface of the nut is provided with lugs or projections, it is impossible to make them in automatic screw machines.

The interior of this conical nut 3 is provided with screw-threads 9, preferably machine screw-threads, to cooperate with the machine threads 10 upon the machine bolt 11. It is, of course, to be understood that different form of thread may be employed to cooperate with a different form of screw, as for example, a lag screw, all of which come within the terms of my invention.

To assemble the shield 2 and the cone nut 3, it is merely necessary to bring the shield 2 over the cone 3 and press it down by hand, or give it a soft blow, when the parts will be firmly secured together, as shown in Figs. 7 and 9, and will not become displaced or disassociated due to jarring, vibrations or rough handling in transportation. This relieves the dealer of looking over his stock, upon receiving it from the manufacturer or jobber, to see whether or not any of the parts of the bolt anchors have become disassembled, and to reassemble those that have become separated.

To further insure that the friction of the cone nut 3, within the conical axial bore 5 will be sufficient to prevent disassembling, I may in some instances employ any form of binder, as for example, a drop of rosin, or cementitious material or any other suitable material. I may, in some instances, galvanize the cone nut 3, which not only renders the entire bolt anchor non-corroding, if the shield is made of a non-corroding metal, but also permits of greater friction between the cone nut and the conical axial bore of the shield 2.

The shield 2 may be made of any suitable material, such as brass, aluminum, iron or fibre, but is preferably made of some ductile composition or alloy or lead. Whatever the material employed, the material of the conical nut 3 is stronger than that of the material of which the shield 2 is formed, so that there will be no collapsing of the conical nut, as the powerful expansive force is employed.

I preferably provide my shield 2, with one or more grooves 12, which extend towards, but not into, the axial bore 4, leaving webs 13. These webs 13 are sufficiently strong to resist being ruptured, when the cone 3 is secured in the shield. They are also sufficiently strong to resist being ruptured, when the expansion is used in a hole properly drilled, but will be ruptured if the hole is excessively large. This gives a wide flexibility to the bolt anchor in use, permitting it to operate successfully anud exert a tremendous hold in either a properly drilled hole or one that is quite large and drilled in a slovenly and unworkmanlike manner.

After the webs 13 have performed their function of preventing the shield from expanding prior to its being placed in operative position in the wall, they may or may not be broken when the greater expanding action of the cone nut is applied by turning up the bolt after it has been set in the wall for operation.

It is considered good practice by engineers and mechanics, both from the standpoint of workmanship and economy to drill the hole of as small a diameter as possible to cause the shield to fit snugly in the hole before expanding. In an accurately drilled hole immediate and powerful contact is had between the exterior of the shield and the walls of the hole when the threaded bolt starts to draw the nut outwardly compressing the ductile metal of the shield 2 between the advancing nut and the work at the surface of the hole. This causes the lead or ductile shield to flow into the interstices found in the wall surrounding the hole. Such interstices are formed in the walls of holes drilled in manufactured stone or brick and in natural stone by the dislodgment of pebbles, coarse sand and hard particles constituting the mass.

Used in an accurately drilled hole the ductile shield is compressed or shortened between the nut and the work and at the same time the diameter of the shield is increased uniformly in all directions limited only by its powerful contact with the contour of the hole. Under these conditions the webs separating the grooves from the interior bore may stretch but will not be fractured, see Fig. 3.

Figure 5:
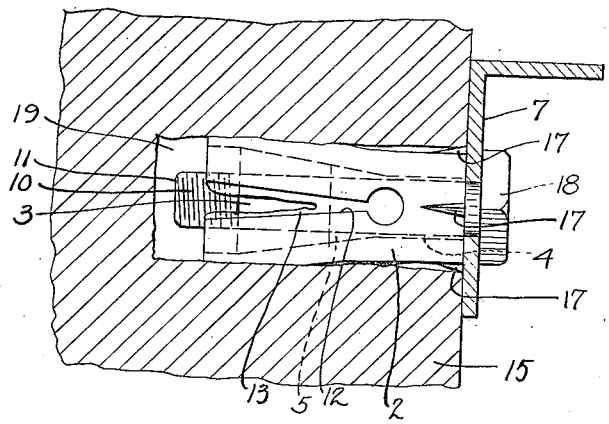
Fig. 5 is a vertical section through the wall or other support and the work showing the bolt anchor in side elevation and expanded in such an enlarged and poorly drilled hole.
Figure 6:
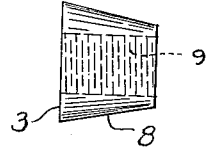
Fig. 6 is a plan view of the cone nut.

When, however, a hole is drilled oversize, Fig. 4, the shortening of the shield and the increasing of its diameter is carried to a greater degree than in the closer fitting hole and the cone nut 2 is drawn further toward the work 7. Under such conditions the expansion of the shield is facilitated by the fracturing of the webs 13 between the grooves and the inner bore of the shield, overcoming the resistance to expansion which would exist if no grooves were provided and if the walls of the shield were of uniform circumferential thickness, see Fig. 5.

In either a close fitting hole or an oversize hole the grooves perform the important function of facilitating the expansion of the shield by permitting stretching of the webs in a close fitting hole and by permitting them to be broken in an oversized hole. If the webs were omitted the separated end of the shield would be forced apart in transit allowing the nut to drop out, with the disadvantages previously pointed out.

It is essential that the greatest possible volume of comparatively soft ductile metal should be used in the shield between the harder cone nut and the work so that the least compression of the metal and the least forward action of the nut will result in filling the hole. The use of webs between the grooves and bore adds to the volume of metal in the shield. Likewise it is preferable to have the grooves extend only part way from the inner extremity of the shield to its outer extremity to increase the volume of metal in the shield. The absence of the groove at the outer end of the shield, adjacent to the work 7, causes it to resist expansion at this end, preventing the possible cracking of the wall 15 at the surface and forming a more substantial support for the bolt when it is placed in shear.

In positioning the bolt anchor, I have shown in Figs. 1, 2 and 3, the operation when the hole 14 in the wall or other suitable support 15, is properly drilled to receive it. In these figures, the shield 2 and the nut 3 are located as shown in Fig. 2, leaving the end 16 of the shield flush with the surface of the wall, the ribs 17, 17 biting into the walls of the hole. For purposes of illustration, the clearance of the shield within the hole and its subsequent expansion are shown somewhat exaggerated. The work 7, of any suitable description, is then brought up to the surface of the wall 15, and the bolt 11 is passed through it and along the axial bore 4 and 5 into the bore of the cone nut 3 to cooperate with the threads 9 therein, see Fig. 2. By then rotating the head 18 of the nut in any suitable manner, as by a monkey wrench or spanner, the conical nut 3 is caused to move up the conical axial bore 5 towards the work 7. In traveling in this direction, however, it exerts a tremendous expansion upon the shield 2, causing the shield to firmly grip the interior wall of the hole 14.

By my invention, in which I preferably employ a ductile shield 2, the powerful expansion exerted by the iron conical nut 3 causes the metal of the shield 2 to flow, more or less, as shown in Fig. 1, filling up all the inequalities or voids on the interior of the wall or the hole. By forcing the metal to flow into these inequalities, I obtain a particularly strong union or hold with the wall or other suitable support. Experiments have shown that my bolt anchor is of tremendous power.

Having thus described this invention in connection with an illustrative embodiment thereof, to the details of which I do not desire to be limited, what is claimed as new and what is desired to secure by Letters Patent is set forth in the appended claims.

What I claim is:—

1. A bolt anchor comprising a ductile compressible shield having an axial bore greater in diameter at one extremity, the shield provided on its exterior with grooves extending from its expanding end towards its non-expanding end, and a cone shaped nut frictionally engaged in the interior of the shield at its expanding end.

2. A bolt anchor comprising a cylindrical shield of compressible ductile material having an axial bore, said bore being conical at the expanding end of the shield and cylindrical at the non-expanding end of the shield, said shield being provided on its exterior surface with longitudinal grooves sunk inwardly toward but not to the said interior bore, and means for shortening the shield and increasing its outer diameter.

3. A bolt anchor comprising a cylindrical shield of compressible and ductile material provided with an unbroken axial bore, said shield having grooves sunk into its exterior surface longitudinal with the axis of the shield, said grooves being separated from the interior bore by webs and expanding means cooperating with a bolt and bolt head to compress and shorten the shield and to increase its diameter uniformly.

4. A machine bolt expansion comprising a tubular compressible ductile shield provided with one or more grooves sunk into its exterior surface longitudinally with its axis, said grooves being separated from the bore by webs, said webs being of sufficient strength to prevent the accidental fracture and opening up of the shield and not of sufficient strength to resist the ready opening and spreading of the shield in operation, and a cone shaped expanding nut.

5. A new article of manufacture comprising a tubular ductile expansion shield having interior expanding means, the surface of such shield being provided with one or more longitudinal grooves, said grooves not extending through to the interior of the shield, such grooves beginning at the inner end of the shield and terminating before the opposite end of the shield is reached.

6. A new article of manufacture comprising a tubular ductile expansion shield provided on its interior with expanding means, said means actuated by a threaded bolt, said shield being provided with one or more longitudinal grooves, said grooves not cut through to the interior of the shield and said grooves beginning at the inner end of the shield and extending toward but terminating before reaching the opposite extremity.

7. A new article of manufacture comprising a tubular compressible expansion shield adapted to be compressed longitudinally and thereby expanded diametrically by a machine bolt acting upon an expanding means in the interior of the shield, said shield being provided with one or more longitudinal grooves and said grooves extending from the inner end of the shield and extending toward but terminating before reaching the opposite extremity.

HENRY W. PLEISTER.

Witnesses:
MARY R. RYAN,
MAYE D. LINK.